United States Patent [19]

Weisner et al.

[11] 4,435,141
[45] Mar. 6, 1984

[54] MULTICOMPONENT CONTINUOUS FILM DIE

[75] Inventors: Carl S. Weisner, Pleasant Hill; David W. Raynolds, Fairfield, both of Calif.

[73] Assignee: Polyloom Corporation of America, Dayton, Tenn.

[21] Appl. No.: 366,238

[22] Filed: Apr. 7, 1982

[51] Int. Cl.³ ............................................. B29F 3/12
[52] U.S. Cl. .................................. 425/131.1; 264/171;
425/133.5; 425/192 R; 425/379 R; 425/462;
425/467
[58] Field of Search .................. 425/131.1, 133.5, 462,
425/467, 190, 379 R, 192 R; 264/171

[56] References Cited

U.S. PATENT DOCUMENTS

| | | | |
|---|---|---|---|
| 660,717 | 10/1900 | Barber et al. | 425/131.1 |
| 1,356,891 | 10/1920 | Steinle | 425/131.1 |
| 1,603,812 | 10/1926 | Stein | 425/131.1 |
| 1,603,813 | 10/1926 | Stein | 425/131.1 |
| 2,808,617 | 10/1957 | Terracini et al. | 425/462 |
| 3,032,008 | 5/1962 | Land et al. | 425/382 R |
| 3,443,277 | 5/1969 | Frielingsdorf | 264/171 |
| 3,761,211 | 9/1973 | Parkinson | 425/462 |
| 3,761,552 | 9/1973 | Chill et al. | 264/37 |
| 3,807,918 | 4/1974 | Chill et al. | 425/131.1 |
| 3,927,957 | 12/1975 | Chill et al. | 425/131.1 |

FOREIGN PATENT DOCUMENTS

| | | |
|---|---|---|
| 203372 | 8/1923 | United Kingdom . |
| 354837 | 8/1931 | United Kingdom . |
| 374148 | 6/1932 | United Kingdom . |
| 728025 | 4/1955 | United Kingdom . |
| 1101227 | 1/1968 | United Kingdom . |
| 1111054 | 4/1968 | United Kingdom . |

Primary Examiner—Jeffery R. Thurlow
Attorney, Agent, or Firm—Burns, Doane, Swecker & Mathis

[57] ABSTRACT

An elongated flat die, for extruding parallel streams of different polymers to form a continuous, striped film, includes a body member which houses a replaceable insert. The insert is formed with grooves on at least two abutting surfaces, which, together with the interior surfaces of the body member, define separate, alternating passages through which the polymers flow. Streams of the different polymers flow together in alternating arrangement and exit the die through a variable lip passage.

15 Claims, 6 Drawing Figures

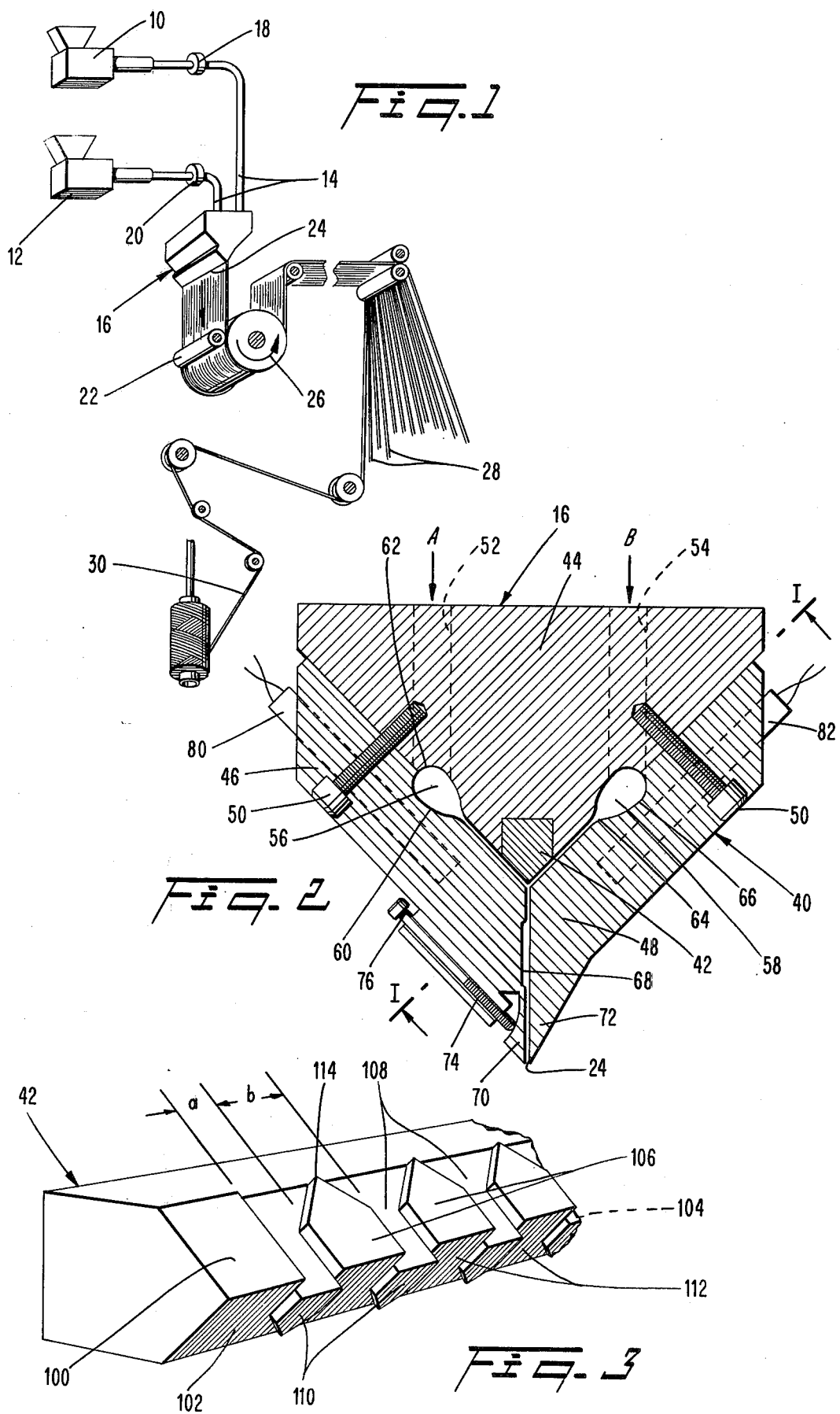

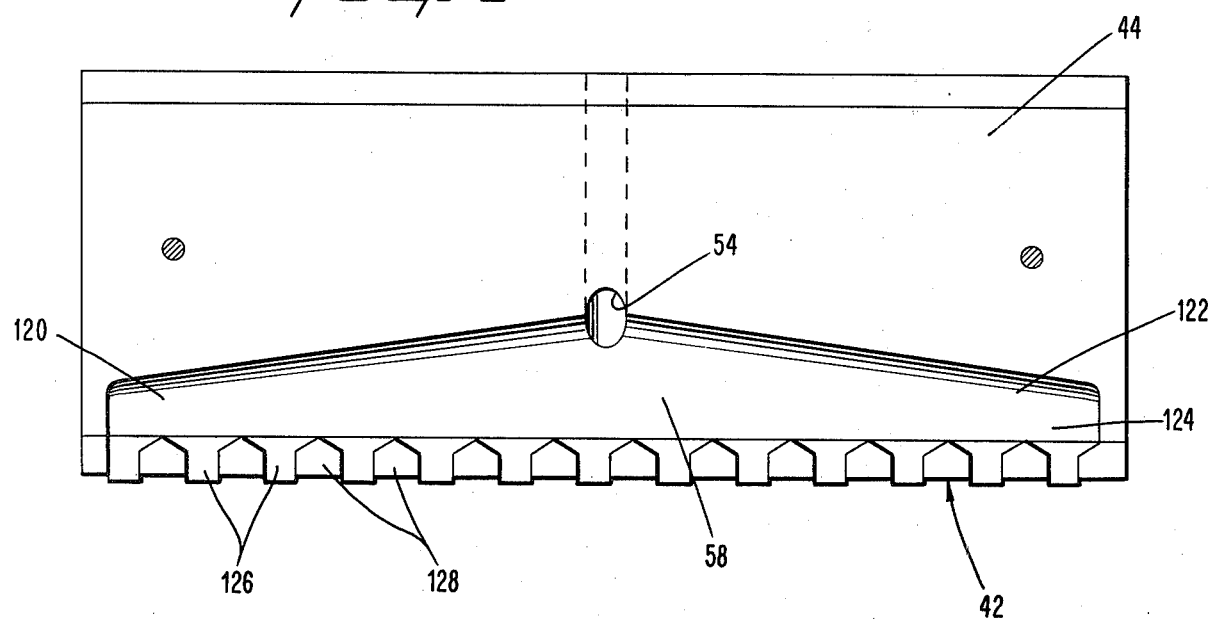
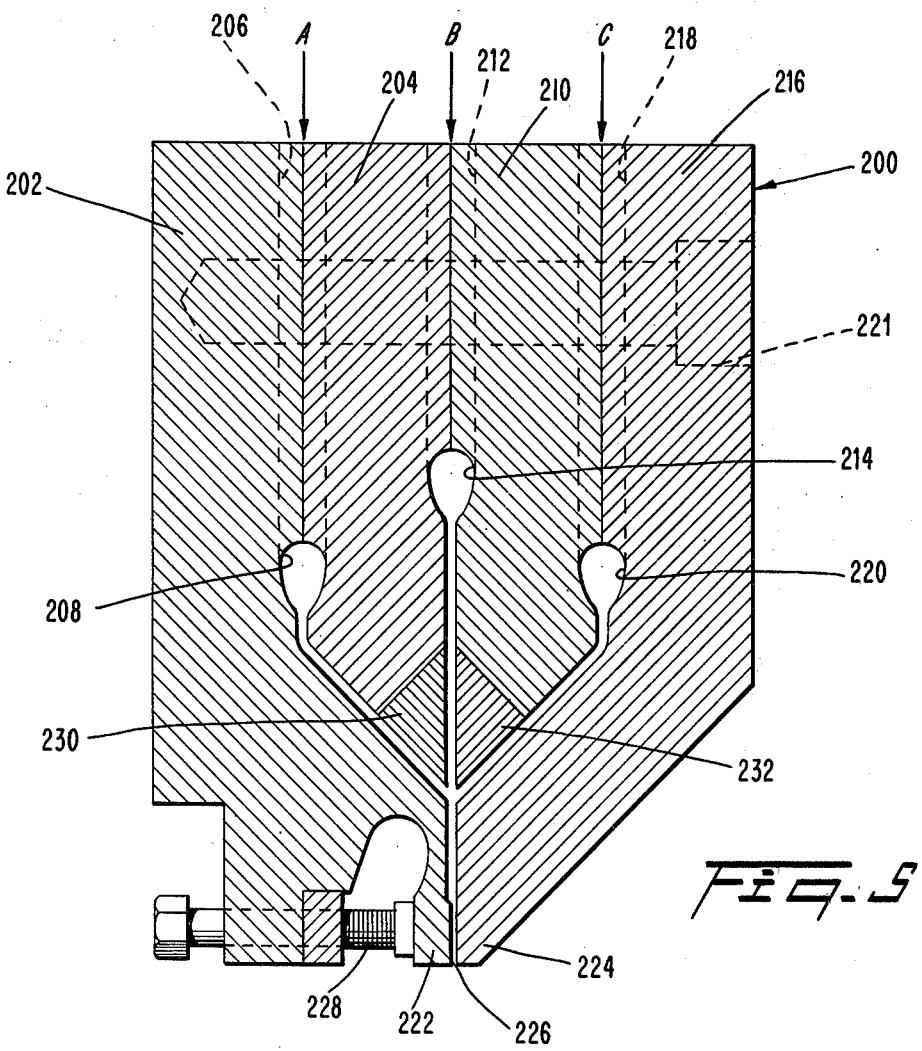

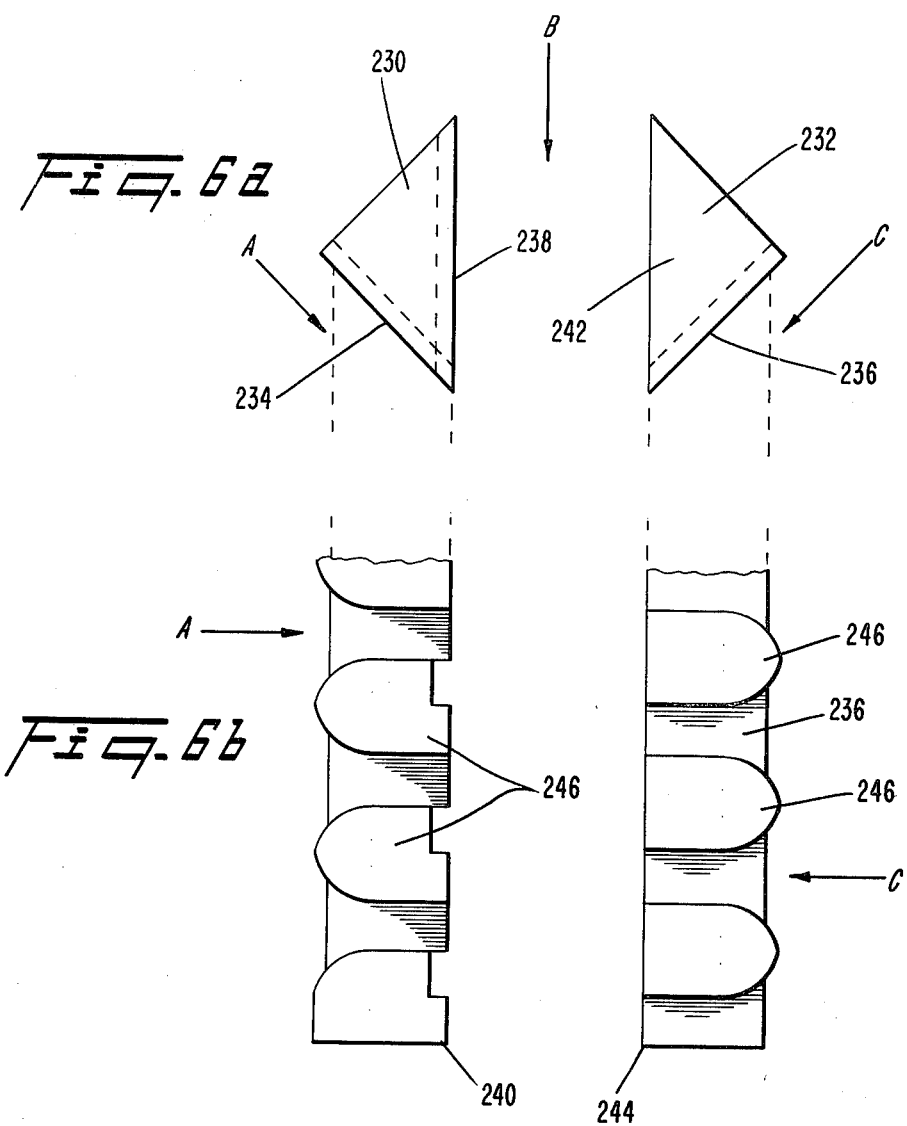
Fig. 6a
Fig. 6b
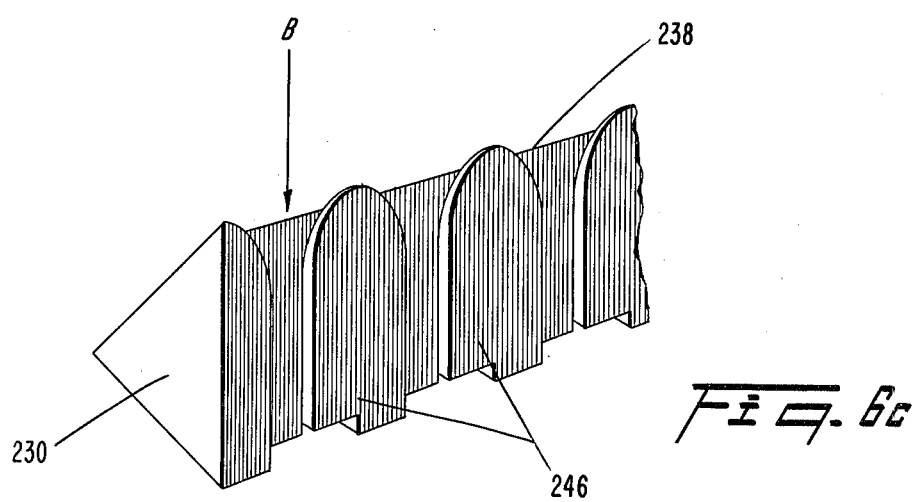
Fig. 6c

MULTICOMPONENT CONTINUOUS FILM DIE

BACKGROUND OF THE INVENTION

This invention relates to an improved extrusion die for producing a multicomponent continuous polymer film, especially a striped thermoplastic polymer film useful in making yarns.

For a number of years, multicomponent polymer films have been extruded for making yarns. In particular, yarns suitable for heavy duty uses such as indoor-outdoor carpets have been produced from such multicomponent films. It is known to fibrillate and slit thermoplastic films into narrow webs which can then be twisted into yarns and twines. By using a multicolored film or striped film, different color effects can be obtained when the fibrillated web is twisted, to afford esthetically pleasing color combinations.

A multicomponent extrusion die which can be used to extrude such a film is described in U.S. Pat. No. 3,807,918. Although generally this prior art die performs satisfactorily, it has certain disadvantages. The prior art die employs a flow splitting insert which comprises a bar with an array of outlets, supplied with molten polymer from a common conduit. The outlets, in embodiments in the prior art, are cylindrical holes drilled in the bar. Each outlet extrudes a stream of polymer which is intended to form a stripe of a longitudinal width greater than the longitudinal width of the outlet. The prior art die has internal dead areas in which the viscous polymer can stagnate. The stagnation can lead to overheating and degrading of the stagnated polymer. Moreover, the prior art die may produce polymer streams with non-uniform velocity, since the polymer stream must spread out after exiting the outlet. In addition, the outlet holes of the prior art die are difficult to clean.

SUMMARY OF THE INVENTION

The present invention provides improved multicomponent film dies which eliminate dead areas by facilitating a sweeping flow action through the dies, which reduce stream velocity non-uniformities, and which are easy to clean.

Such dies may include an elongated body member, and an elongated insert bar. The body member may be formed with two or more internal manifolds for longitudinally and separately distributing two or more thermoplastic polymer feedstocks which flow together as they are extruded through a lip passage in the die. The body member of the die houses the elongated insert bar which, together with surfaces of the body member, forms longitudinally alternating passages communicating between the separate manifolds and the common lip passage of the die.

In a preferred embodiment of the invention, the insert bar is formed with grooves in two abutting surfaces thereof, the first grooved surface of the insert cooperating with an interior surface of the body member to form a first group of passages for a first polymer feedstock to produce separate parallel streams of the first polymer feedstock. Similarly, the second grooved surface of the insert cooperates with another interior surface of the body member to form a second group of passages for a second polymer feedstock to produce separate parallel streams of the second feedstock. Advantageously, the longitudinal widths of all the groups of passages are essentially non-overlapping and equal the longitudinal width of the lip passage. The streams of the polymer feed stocks from the various groups of passages are interspersed in a predetermined array, dictated by the relative location of the passages, to form a striped film.

In another embodiment of the invention, the insert bar is formed with a plurality of spaced projections arranged in staggered array. The projections may have the cross-sectional configuration of a streamlined pentagon having an apex opposite a substantially straight base side parallel to the direction of elongation of the body member. The projections provide a gradual constriction to the flow of the polymer feedstock as it flows downstream past the insert bar, without producing dead areas.

In another embodiment of the invention, each manifold includes two widened leg portions extending generally longitudinally from a central conduit through which the feed stock is introduced into the die. A narrowed portion of the manifold extends from the legs to the insert bar passages. The manifold is dimensioned and configured so that the pressure differential between the conduit and the grooves is approximately constant.

It is an object of the present invention to provide a simply and inexpensively fabricated die for producing multicomponent continuous films.

It is a further object of the present invention to provide a multicomponent film die with a die insert which is easily changed and cleaned.

It is a further object of the present invention to provide a multicomponent film die which eliminates voids or holidays in the film produced thereby.

It is a further object of the present invention to provide a multicomponent film die which reduces stream velocity non-uniformities.

It is a further object of the present invention to provide a multicomponent die which reduces dead areas.

It is a further object of the present invention to provide a multicomponent film die which reduces time and temperature degradation of viscous molten polymer introduced into the die.

These and other objects and features will be apparent from this written description and appended drawings.

BRIEF DESCRIPTION OF THE DRAWINGS

The drawings illustrate preferred, nonlimiting embodiments of the invention wherein like reference numbers refer to like parts and wherein:

FIG. 1 is a schematic diagram illustrating steps in the process for making thermoplastic film and making yarn therefrom.

FIG. 2 is a cross-sectional view of a die apparatus of a preferred embodiment of the present invention.

FIG. 3 is a pictorial view of an insert bar which may be employed in the die apparatus of FIG. 2.

FIG. 4 is a cross-sectional view of the die apparatus of FIG. 2, taken along plane I—I of FIG. 2, and illustrating the manifold structure of the die apparatus.

FIG. 5 is a cross-sectional view of a die apparatus of a preferred embodiment of the present invention adapted for simultaneously handling three polymer feedstocks.

FIG. 6a is a cross-sectional view of a pair of insert bars which may be employed in the die apparatus of FIG. 5.

FIG. 6b is a side view of the pair of insert bars of FIG. 6a.

FIG. 6c is a pictorial view of one of the insert bars of FIG. 6a.

DETAILED DESCRIPTION OF THE DRAWINGS

Referring first to FIG. 1, a schematic diagram is presented illustrating steps in the process for making thermoplastic film and producing yarn therefrom. Such a process is described in greater detail in U.S. Pat. No. 3,761,552.

In the apparatus of FIG. 1, different thermoplastic polymer feedstocks may be introduced into their respective melt screw extruders 10 and 12. The polymer feedstock is melted in the extruders 10 and 12 and forced at a predetermined pressure and temperature through tubing 14 to a die apparatus 16. Monitoring devices 18 and 20 (including, for example, thermocouples and pressure sensitive switches) are provided to continuously monitor molten polymer feedstock provided by the extruders 10 and 12. Positive displacement metering pumps can also be used to control the flow of the polymer feedstock to the die apparatus 16. In any event, the temperature of the polymer feedstock must be great enough to exceed its melting point and high enough to reduce the viscosity of the feedstock so that it can be readily transported and extruded. However, the temperature should not be so high that thermal degradation of the polymer feedstock results. Advantageously, the temperature of each polymer stream is controlled so that the melt characteristics of the feedstocks are very similar thereby facilitating formation of stripes of the desired width in the finished film. Since the addition of pigments or stabilizers may change the melt characteristics of any polymer, it may be necessary to maintain the feedstocks at different temperatures in order to obtain the desired melt characteristics.

A confluence of the molten polymer feedstocks occurs in the die apparatus 16 and a multicomponent film 22 is extruded from an elongated lip aperture 24 of the die apparatus 16 in the direction indicated by the arrow. The formation of stripes in the film by the confluence of the various molten polymer stocks is discussed in greater detail with reference to the remaining figures.

The extruded film 22 may be taken up on a casting roll 26. The thickness of the film can vary from 1 mil to 10 or more mils, depending on the desired denier, and is controlled by the rate of polymer feedstock flow and adjustments to the extrusion lip, discussed in detail below. The multicomponent film may then be processed in accordance with the procedure described in U.S. Pat. No. 3,761,552. Such processing may include the production of thin strips 28 from the film, which may be fibrillated and twisted to make yarn 30.

FIG. 2 is a cross-sectional view of a die apparatus 16 which may be used in the process described generally in connection with FIG. 1. The die apparatus 16 includes a elongated body member 40 and an insert 42. As used herein, the terms "longitudinal" and "elongated" refer to a direction generally perpendicular to the direction of extrusion of the film. The die body member 40 may itself comprise a body block 44 and two opposing body sections 46 and 48. The opposing body sections 46 and 48 may be held to the body block 44 by one or more bolts 50. For simplicity in illustration, only a single bolt is shown holding each of the body sections to the body block, it being understood that a sufficient number of bolts are employed to maintain the various sections in sealing contact with one another.

The body block 44 may be formed with a first conduit 52 (shown in phantom) for conducting a first molten thermoplastic polymer feedstock (indicated schematically by the arrow labelled A). Likewise, the body block may be formed with a second conduit 54 (shown in phantom) for conducting a second molten thermoplastic feedstock (indicated schematically by the arrow B). Molten thermoplastic polymer feedstock may be forced to flow into the conduits 52 and 54 under pressure in the directions indicated by the arrows. From the conduits the feedstocks flow to the respective manifolds 56 and 58.

The first body section 46 is formed with a manifold surface 60 for defining, with a surface 62 of the body block 44, a first manifold for longitudinally distributing the thermoplastic polymer feedstock A. Similarly, the second opposing body section 48 is formed with a manifold surface 64 for defining, with another surface 66 of said body block, a second manifold for longitudinally disstributing the second thermoplastic polymer stock B. The first and second body sections 46 and 48 together define a lip passage 68 for conducting the confluence of the thermoplastic polymer stocks A and B to the elongated lip aperture 24 through which the film is extruded. The thickness of the extruded film may be controlled by the spacing between lip portions 70 and 72 of the opposing body sections 46 and 48. This spacing can be varied by means of a screw 74 which may be employed to force the bottom of the lip portion 70 against the bottom of the lip portion 72. The screw 74 may be turned by means of head 76.

The insert bar 42 may be located within a longitudinal groove 78 in the body block 44. An embodiment of the insert bar is described in greater detail in connection with FIG. 3. The insert bar 42 together with surfaces of the opposing body sections 46 and 48 forms separate longitudinally alternating passages communicating between the manifolds 56 and 58 and the lip passage 68. As the molten thermoplastic polymer feedstock is forced from the manifolds through the passages, it is constrained by the lip portions of the opposing body sections. The confluent continuous flow of the thermoplastic polymer feedstock from the passages forms a continuous multicomponent film. Temperature within the die apparatus may be controlled to maintain the proper melt characteristics of the polymer feedstocks passing therethrough by means of electric heater cartridges 80 and 82 housed within the opposing body sections 46 and 48, respectively.

Referring now to FIG. 3, an embodiment of an insert bar 42, which may be used in the apparatus of FIG. 2, is shown pictorially. The insert bar is formed with a first face 100 and a second face 102 meeting at a common, notched longitudinal edge 104. A plurality of projections are formed in each of the faces 100 and 102 which function to split the flow of the polymer stocks into separate streams which are interspersed adjacent to the edge 104 to form the striped extruded film. The projections 106 in the first face 100 define grooves or slots 108 therebetween through which the molten thermoplastic polymer feedstock may flow. Likewise, the projections 110 in the face 102 serve to define grooves or slots 112 through which another polymer stock may separately flow. The dimensions of the slots are selected on the basis of the pattern desired in the finished film. For example, in one embodiment the slot width a is two tenths of an inch and the slot width b is four tenths of an inch. The stripes formed by these slots are of approximately the same width as the slots. Accordingly, the streams of polymer produced by the slots doe not have to spread out to form a continuous film.

The projections 106 and 110 may be formed with triangularly tapered portions, such as 114, to provide a pentagonal cross-section and provide a gradual constriction upstream of said common longitudinal edge 104. This provides for a sweeping flow through the longitudinal extent of the manifold which help to reduce time and temperature degradation of polymer feedstock by reducing stagnation and dead areas.

Referring now to FIG. 4, a cross-sectional view is shown of the die apparatus of FIG. 2, the cross section being taken along plane I—I of FIG. 2. FIG. 4 illustrates the manifold structure of the die apparatus of FIG. 2. The figure shows the arrangement of the insert bar 42 and the body block 44 with the insert bar in position. The manifold structure of the die apparatus may include widened leg portions 120 and 122 for receiving molten thermoplastic polymer stock from the conduit 54. Molten polymer stock from the leg portions 120 and 122 may be forced to pass through a narrowed slot portion 124 of the manifold. Finally, the insert bar 42, together with the body member, defines passages 126 through which the thermoplastic polymer feedstock B flows prior to being interspersed with streams of feedstock A from longitudinally alternating passages 128 to form stripes in the finished film.

The leg portions 120 and 122 of the manifold and the narrowed portion 124 are dimensioned and configured so that the pressure differential in the thermoplastic feedstock between the conduit 54 and the passages 126 is approximately constant. Alternatively, the depth of the slots on the insert bar may be varied to achieve the desired flow characteristics into the lip passage.

FIG. 5 is a cross-sectional view of a die apparatus 200 of a preferred embodiment of the present invention adapted for simultaneously handling three molten thermoplastic polymer feedstocks A, B and C, and extruding these feedstocks into a continuous multicomponent film. It should be understood that a die for handling any desired number of different polymer feedstocks can be fabricated according to the general teachings of this invention. The die apparatus includes a first body section 202 and a second body section 204 defining, with said first body section, a first conduit 206 (shown in phantom) and a first manifold 208 for the first thermoplastic feedstock A. The die apparatus also includes a third body section 210 defining, with the second body section 204, a second conduit 212 (shown in phantom) and a second manifold 214 for the second thermoplastic feedstock B. Finally, a fourth body section 216 is provided which defines, with the third body section 210, a third conduit 218 (shown in phantom) and a third manifold 220 for a third thermoplastic feedstock C. The four body sections 202, 204, 210 and 216 may be held together by one or more bolts 221. The first body section 202 and the fourth body section 216 may be formed with opposing lip portions 222 and 224 through which the confluence of the three thermoplastic polymer stocks is extruded as a sheet of film via lip passage 226. The thickness of the extruded film may be varied by adjusting the screw 228.

The four body sections of the die apparatus of FIG. 5 house a first insert bar 230 and a second insert bar 232. The first insert bar 230, together with the fist body section 202, defines a first plurality of separated passages through which the first thermoplastic polymer feedstock A flows to the lip passage 226. The second insert bar 232 defines, with the first insert bar 230, a second plurality of separated passages through which the second thermoplastic polymer feedstock B flows to the lip passage 226. Finally, the second insert bar 232 defines with the fourth body section 216 a third plurality of separated passages through which the third thermoplastic polymer feedstock C flows to the lip passage 226.

The structure of the insert bars 230 and 232, shown in FIG. 5, will now be described in greater detail in connection with FIGS. 6a through 6c. FIG. 6a is a cross-sectional view of the two insert bars 230 and 232 showing, in phantom, slots formed therein. These slots, in cooperation with other surfaces, define alternating passages through which the polymer feedstocks flow. FIG. 6b is a side view of the insert bars of FIG. 6a. A first face 234 of insert bar 230 and a first face 236 of insert bar 232 are shown in FIG. 6b. A second face 238 of the insert bar 230 meets the first face 234 at a common notched edge 240. A second face 242 of the second insert bar 232 meets the first face 236 at a common edge 244.

The faces 234, 238 and 236 of the insert bars are formed with alternating projections 246. In the embodiment shown in FIGS. 6a through 6c, the projections are formed with upstream curvilinear cross sections having an apex furthest upstream of the confluence of the thermoplastic polymer feedstocks. Further downstream the projections form parallel walls which define slots or grooves in the insert bars. As discussed above, these slots, together with other cooperating surfaces, form alternating passages for the thermoplastic polymer feedstocks.

FIG. 6c is a pictorial view of the first insert bar 230 showing its second face 238 and the relative positions of the projections therein. It will be clear from FIGS. 5 and 6a through 6c that the insert bars shown are configured to produce a repeating pattern of feedstock streams in the order BACBACB . . . . However, other sequences may be produced by modifying the arrangement slots in the insert bars.

Although the invention has been described in connection with preferred embodiments, it is to be understood that variations and modifications may be resorted to as will be apparent to those skilled in the art. Such variations and modifications are to be considered within the purview and the scope of the claims appended hereto.

What is claimed is:

1. Die apparatus for extruding a multicomponent polymer film between 1 and 10 mils in thickness comprising:
   a body member including a body block and at least one body section, removably attached to said body block, said body member having one manifold through which a feedstock of one molten polymer is flowed and at least one other manifold through which at least another feedstock of molten polymer is flowed, said body member having an elongated lip passage through which a sheet of polymer film formed of said feedstocks is extruded under pressure; and
   an insert, which, together with surfaces of said body member, forms separate, longitudinally alternating passages communicating between said manifolds and said lip passage for interspersing, in alternating arrangement, the feedstocks, said insert including a replaceable bar having a longitudinal axis parallel to a plane of the extruded film and having a planar, longitudinally extending face with a plurality of slots formed therein, wherein the planar face of the bar is abutted with a planar face of the body section when the body section is attached to the body block to define a first plurality of said passages which open into one of said manifolds and longitudinally narrow downstream of said one manifold to facilitate a sweeping flow of feedstock through the die apparatus.

2. Die apparatus for extruding a sheet of film formed of stripes of thermoplastic feedstock alternating across the width of said sheet, comprising:
- a body member including
  - a body block;
  - a first body section, removably attached to said body block, having a manifold surface for defining with a surface of said body block, a first manifold for longitudinally distributing a first thermoplastic feedstock;
  - a second, opposing body section, removably attached to said body block, having a manifold surface for defining, with another surface of said body block, a second manifold for longitudinally distributing a second thermoplastic feedstock, said first and second body sections together defining a lip passage, through which the film is extruded; and
- an insert, held within said body member by said body sections, which, together with surfaces of said body sections forms separate, longitudinally alternating passages communicating between said manifolds and said lip passage.

3. The die apparatus of claim 2 wherein said insert may be removed from said body member and replaced with another insert means forming a different array of alternating passages to produce a different configuration of thermoplastic stripes.

4. The die means of claim 2 wherein each of said manifolds includes
- two widened leg portions extending generally longitudinally from a central intake conduit, and a narrowed portion extending from said legs to said insert means, wherein said manifold is dimensioned and configured so that the pressure differential in the thermoplastic stock between said conduit and the alternating passages is approximately constant.

5. Die means for extruding a continuous sheet of film formed of stripes of three thermoplastic stocks alternating across the width of said sheet comprising:
- a first body section;
- a second body section defining, with said first body section, a first conduit and a first manifold for a first thermoplastic stock;
- a third body section defining, with said second body section, a second conduit and a second manifold for a second thermoplastic stock;
- a fourth body section defining, with said third body section, a third conduit and a third manifold for a second thermoplastic stock, wherein said fourth body section opposes a lip portion of said first body section to form a lip passage through which the confluence of said polymer stocks is extruded as said sheet of film;
- a first insert bar, defining with said first body section, a first plurality of separated passages through which said first polymer stock flows to said lip passage; and
- a second insert bar,
  - defining with said first insert bar, a second plurality of separated passages through which said second polymer stock flows to said lip passage, and
  - defining with said fourth body section, a third plurality of separated passages through which said third polymer stock flows to said lip passage.

6. An elongated flat die for producing approximately parallel streams of different molten polymer feedstock to form a continuous film between 1 and 10 mils in thickness with stripes of the different polymers alternating along the direction of elongation comprising, a body member which houses an elongated insert held in place between at least two separable component parts of said body member, said insert being formed with grooves in at least two surfaces thereof, the first grooved surface of the insert cooperating with an interior surface of one component part of the body member to form a first group of passages for a first polymer feedstock to produce separate parallel streams of the first polymer feedstock, and the second grooved surface of the insert cooperating with an interior surface of the other component part of the body member to form a second group of passages for a second polymer feedstock to produce separate parallel streams of the second polymer feedstock, the streams of the polymer stocks being interspersed in a predetermined array downstream from the insert.

7. The die of claim 6 wherein the longitudinal width of the passages is approximately equal to the width of corresponding stripes in the film.

8. An elongated flat die for extruding a continuous multicomponent polymer film composed of stripes of at least two different polymer feedstocks, comprising:
- a body member elongated in a direction generally perpendicular to the direction of extrusion of the film and having an extrusion aperture with a longitudinal width substantially equal to the longitudinal width of the extruded film, said body member including plural body sections mechanically fastened together; and
- a replacable insert, held in place within said body member by at least two removable body sections when said body sections are fastened together, said insert including at least one elongated bar,
- wherein at least one surface of said insert is juxtaposed with at least one generally planar surface of a first one of said body sections to form a first set of longitudinally spaced passages for a first molten polymer feedstock;
- wherein at least one other surface of said insert is juxtaposed with at least one generally planar surface of a second one of said body sections to form a second set of longitudinally spaced passages, separate from the first set of passages, for a second molten polymer feedstock;
- wherein abutting faces of two of said body sections define a first manifold therebetween for supplying the first molten polymer feedstock to the first set of longitudinally spaced passages;
- wherein abutting faces of two of said body sections define a second manifold therebetween for supplying the second molten polymer feedstock to the second set of longitudinally spaced passages; and
- wherein the polymer feedstocks exit their respective spaced passages and are extruded together from said extrusion aperture.

9. The die apparatus of claim 2 wherein said manifolds communicate with their respective alternating passages, and wherein each passage tapers, longitudinally, downstream from the manifold to facilitate a sweeping flow of said feedstocks through the die apparatus.

10. The die apparatus of claim 2 wherein said insert and said manifold surfaces are exposed by removal of said body sections.

11. The die apparatus of claim 2 further comprising a first electric heater element inserted in said first body section, and a second electric heater element inserted in said second section block.

12. The die apparatus of claim 2 wherein said body block has a first principal surface, a portion of which defines said first manifold surface, and a second principal surface, a portion of which defines said second manifold, said principal surfaces being inclined toward one another to define a V-shaped cross-section with said insert located at the apex thereof.

13. The die apparatus of claim 12 further comprising threaded fasteners for holding said first body section against said first principal surface and for holding said second body section against said second principal surface.

14. The die apparatus of claim 1 wherein said body member includes two opposing body sections, each removably attached to said body block, and wherein said insert bar has a second planar, longitudinally extending face with a plurality of slots formed therein, said second planar face being abutted with a planar face of the second body section to define a second plurality of passages which open into the other of said manifolds and longitudinally narrow downstream of said other manifold to facilitate a sweeping flow of feedstock through the die apparatus.

15. The die apparatus of claim 14 wherein the first and second faces of said insert bar intersect in a notched, longitudinal edge located adjacent the lip passage, the lip passage being defined by portions of said two body sections.

* * * * *